K. R. VAUGHT.
ADJUSTABLE HEADLIGHT.
APPLICATION FILED MAR. 21, 1917.
1,250,249.  Patented Dec. 18, 1917.
3 SHEETS—SHEET 1.
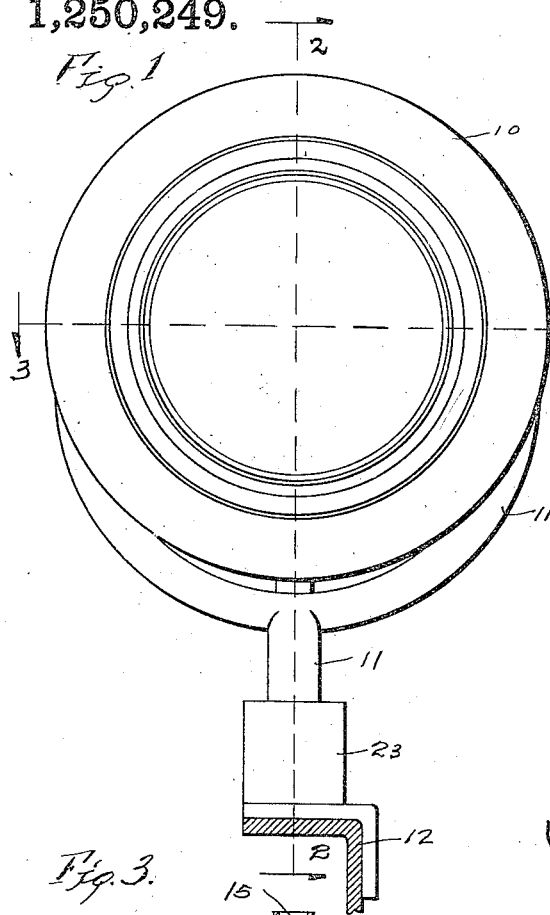
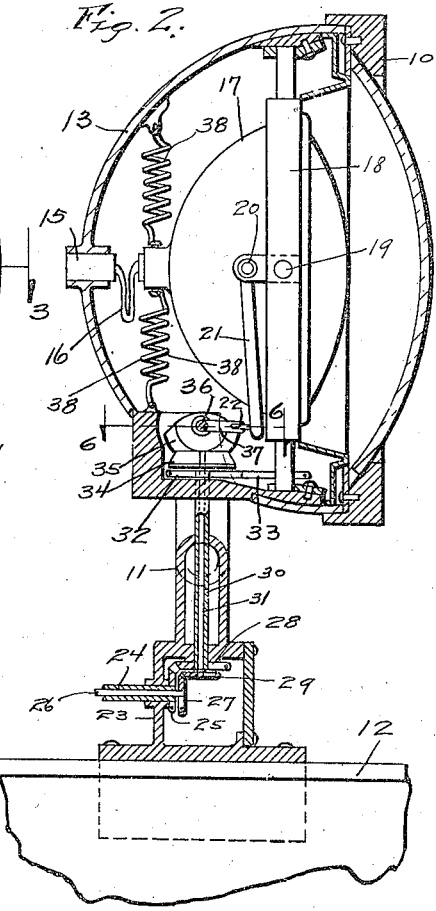
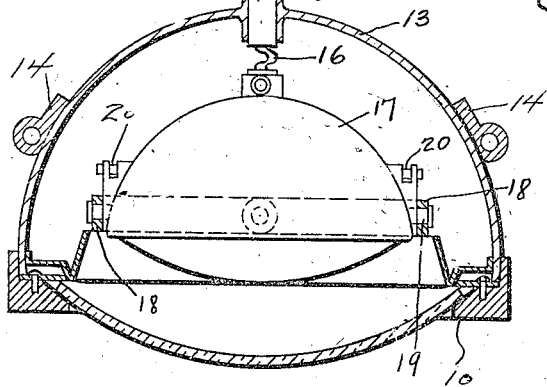
Inventor
KARL R. VAUGHT
By
Lockwood Lockwood
Attorneys

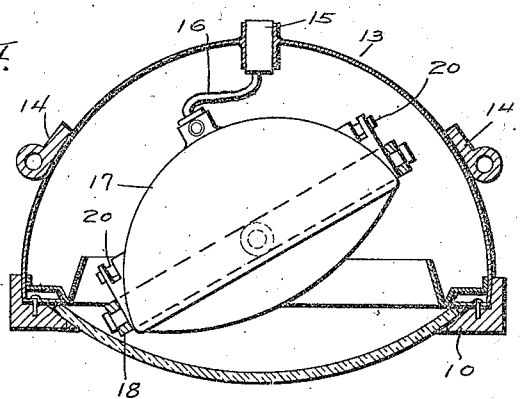
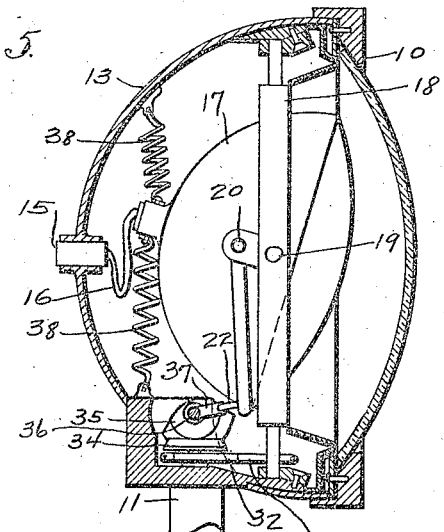
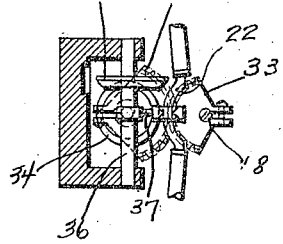

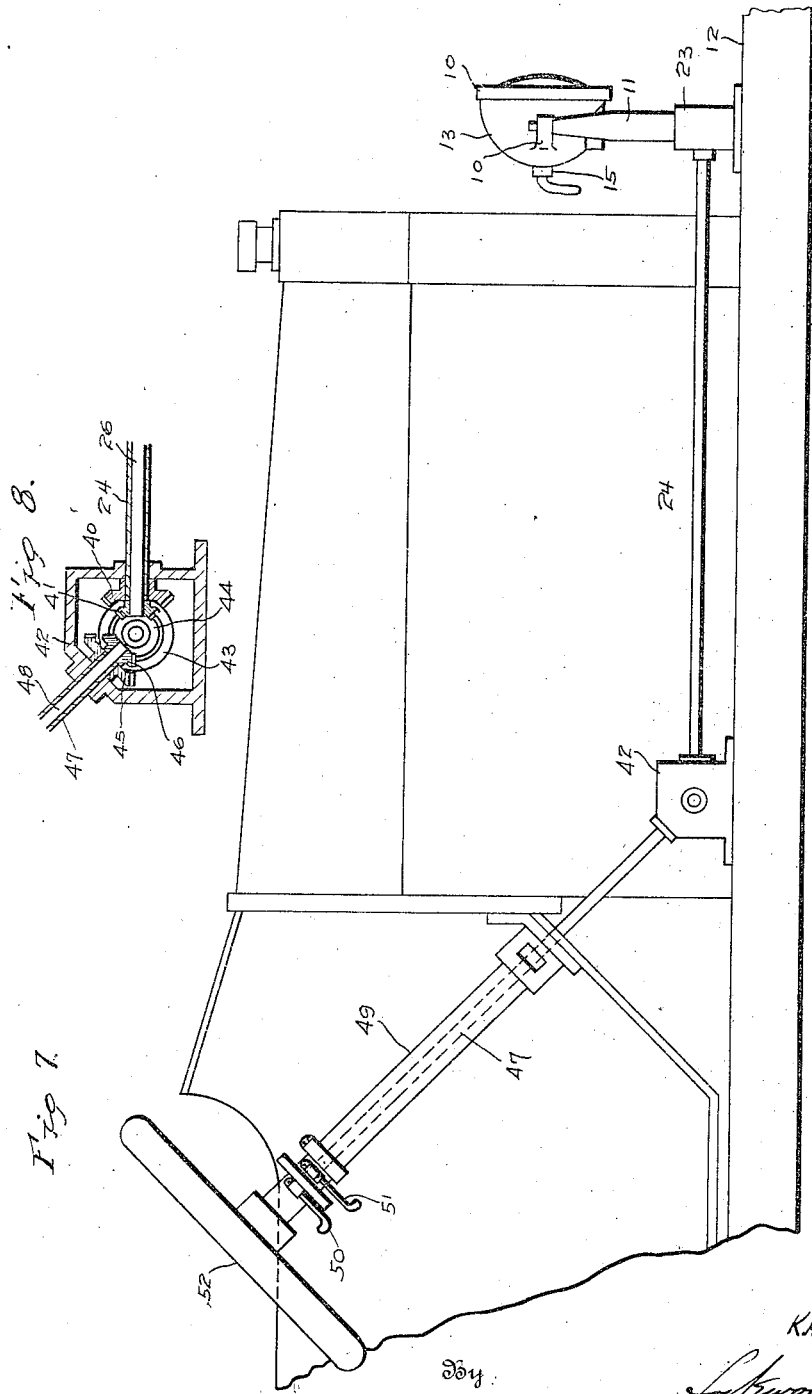

UNITED STATES PATENT OFFICE.

KARL R. VAUGHT, OF INDIANAPOLIS, INDIANA.

ADJUSTABLE HEADLIGHT.

1,250,249.

Specification of Letters Patent.   Patented Dec. 18, 1917.

Application filed March 21, 1917.   Serial No. 156,403.

*To all whom it may concern:*

Be it known that I, KARL R. VAUGHT, a citizen of the United States, and a resident of Indianapolis, county of Marion, and State of Indiana, have invented a certain new and useful Adjustable Headlight; and I do hereby declare that the following is a full, clear, and exact description thereof, reference being had to the accompanying drawings, in which like letters refer to like parts.

This invention relates to a headlight for automobiles and the like which may be turned to throw the stream of light to either side of the path of the automobile or up and down as desired. The control of the lamp is so constructed that it may be operated from the steering wheel of the machine.

The main feature of this invention is the construction of the headlight and reflector including the manner in which it is mounted in the casing whereby it will swing laterally or vertically as desired. This is accomplished by pivoting the reflector on a vertical pivot frame and in turn pivoting said frame in the casing, whereby the reflector will swing vertically in the pivot frame and the frame will turn horizontally in the casing.

A further feature of the invention is the mechanism for operating the lamp and reflector in a headlight from the steering wheel so as to adjust it to any desired position, which mechanism will be hereinafter more fully shown and described.

The full nature of the invention will be understood from the accompanying drawings and the following description and claims.

Figure 1 is a front elevation of the headlight. Fig. 2 is a cross section taken on the line 2—2 of Fig. 1. Fig. 3 is a cross section taken on the line 3—3 of Fig. 1. Fig. 4 is the same as Fig. 3 with the lamp and reflector turned laterally. Fig. 5 is the same as Fig. 2 showing the lamp and reflector tilted vertically and with a portion of the mechanism broken away. Fig. 6 is a section on the line 6—6 of Fig. 2. Fig. 7 shows a side elevation of the front portion of an automobile in dotted lines with the headlight controlling mechanism therein. Fig. 8 is an enlarged view taken in a central vertical cross section through the housing at the lower end of the steering post.

In the drawings there is shown a headlight 10 mounted on a bracket 11 which is secured to the frame 12 of an automobile. The headlight 10 is provided with a casing 13 which has the members 14 secured on the sides thereof through which the ends of the brackets 11 project so as to rigidly secure the headlight thereon. Extending through the rear of the casing 13 there is a plug 15 having connected therewith a flexible conductor 16 which in turn is connected to the lamp bulb not shown herein through the reflector 17. The flexible connection is so arranged as to permit the reflector to turn in the casing in any direction as shown in the drawings.

Pivotally mounted in the casing 13 there is a pivot frame 18 which is supported at both ends by the casing in a vertical position and surrounds the reflector 17 as shown in Fig. 2. The reflector is mounted in the pivot frame on the pivot pins 19. Extending outwardly from the reflector on each side thereof directly back of the pivot pins 19 there are projections 20 to which the bifurcated arm 21 is pivoted at each end thereof. Said arm surrounds the lower portion of the reflector and is provided with a curved portion 22, see Fig. 6, having its center of curvature in the pivotal center of the pivot frame 18.

The lamp bracket 11 is provided with a housing 23 at the base thereof. A tubular shaft 24 extends into said housing so as to turn in a bearing in the side thereof, and has secured on its end a beveled pinion 25. Extending through said tubular shaft there is a rod 26 which has a beveled pinion 27 secured to its end. The shaft 24 and rod 26 are shown broken away in Fig. 2, but they may be operated from the steering wheel of the automobile through connections hereinafter described, and which are not seen to be a part of this invention. The pinions 25 and 27 mesh with the beveled pinions 28 and 29 respectively in the housing 23, which are in turn mounted on the end of the tubular shaft 30 and the rod 31 respectively. The tubular shaft 30 extends upwardly through the lamp casing and is secured to the segmental gear 32 which meshes with the segmental gear 33 which is locked on the lower pivotal pin of the pivot frame 18 so that when said tubular shafts 24 and 30 are turned the segmental gears will cause the pivot frame 18 to swing laterally in the casing of the lamp. The rod 31 extends upwardly through the tubular shaft 30 and the segmental gear 32 and has secured on the end thereof a beveled pinion 34 which meshes with a pinion 35 mounted on the shaft 36, said shaft 36 being mounted in the casing so as to turn therein. Secured on said shaft there is an arm 37 adapted to loosely engage the curved portion 22 of the bifurcated arm 21, so that said curved portion of the arm 21 may slide through the arm 37 when the pivot frame 18 is actuated, and when the shaft 36 is actuated the arm 37 will cause the bifurcated arm 21 to tilt the reflector up or down as desired. By means of this mechanism the light may be controlled so as to turn sidewise or up and down by being externally operated. In order to return the reflector to its normal position after having been operated, there are provided a pair of vertical springs 38 which are connected to the rear of the reflector and casing as shown in Fig. 2. The springs 38 also serve to return the lamp to its normal position after having been turned horizontally.

It may therefore, readily be seen that by connecting the shaft 24 and rod 26 to a lever or a like device on the steering wheel, by any of the well known connecting means that when the shaft 24 is turned it will cause the reflector and lamp to turn sidewise or laterally as shown in Fig. 4 for directing its light in the direction that the automobile is being turned or for any other desired purpose, and when the operating device is released the springs 38 will return the reflector to its normal position. When the rod 26 is operated it will cause the reflector to tilt up or down as shown in Fig. 5 for preventing the glare of light on approaching vehicles or for any other desired purpose, and upon release of the operating means the springs 38 will return the lamp to normal position.

In order to operate and control the headlight from the steering wheel there is provided a beveled gear 40 mounted on the opposite end of the tubular shaft 24 from the beveled gear 27. There is a like gear 41 mounted on the same end of the rod 26, said gears operating in a housing 42 at the lower end of the steering post. Said gears are in position to mesh with the beveled pinions 43 and 44 respectively which in turn mesh with the gears 45 and 46 respectively. The gear 45 is mounted on the lower end of the tubular shaft 47 and the gear 46 on the rod 48, said shaft and rod extending upwardly through or adjacent the steering post 49. The shaft 47 is operated by means of a lever 50 and the rod 48 is controlled by the lever 51 which are located immediately below the steering wheel 52 whereby the operator will have ready access thereto.

The invention claimed is:

1. An adjustable headlight including a casing, a reflector having a lamp therein, a hollow member having means thereon for turning the reflector and lamp in one plane and an additional member extending through said hollow member having means thereon for turning the reflector and lamp in another plane.

2. An adjustable headlight including a casing, a reflector pivotally mounted in said casing, a lamp in said reflector, a shaft extending through said casing for turning said reflector horizontally, and a rod extending through said casing for causing said reflector to be turned vertically.

3. An adjustable headlight including a casing, a vertical pivot frame pivotally mounted in said casing, a reflector pivotally mounted on said pivot frame, a lamp in said reflector, means adapted to be externally operated for causing said reflector to swing on said pivot frame and means operable independently of the first means to cause said pivot frame to turn in said casing.

4. An adjustable headlight including a casing, a vertical pivot frame pivotally mounted in said casing, a reflector pivotally mounted in said pivot frame, a lamp in said reflector, a bifurcated arm pivotally mounted on said reflector for causing it to swing in said pivot frame and externally operated means for independently controlling the pivotal movement of said pivot frame and said arm.

5. An adjustable headlight including a casing, a vertical pivot frame pivotally mounted in said casing, a reflector pivotally mounted in said pivot frame, a lamp in said reflector, a bifurcated arm pivotally mounted on said reflector for causing it to swing in said pivot frame, an externally operated shaft extending through said frame in position to engage and turn said pivot frame, and an externally operated rod extending through said frame in a position to operate said bifurcated arm.

6. An adjustable headlight including a casing, a vertical pivot frame pivotally mounted in said casing, a reflector pivotally mounted in said pivot frame, a lamp in said reflector, a bifurcated arm pivotally mounted on said reflector for causing it to swing in said pivot frame, a segmental gear mounted on said pivot frame, an externally operated shaft having a segmental gear on the end thereof in position to mesh with said last mentioned gear whereby said frame will be turned, and externally operated means for actuating said bifurcated arm whereby said reflector may be turned in any direction.

7. An adjustable headlight including a casing, a vertical pivot frame pivotally mounted in said casing, a reflector pivotally mounted in said pivot frame, a lamp in said reflector, a bifurcated arm pivotally mounted on said reflector for causing it to swing in said pivot frame, a segmental gear mounted on said pivot frame, an externally operated shaft having a segmental gear on the end thereof in position to mesh with said last mentioned gear whereby said frame will be turned, a rod extending through said frame having a beveled gear on the end thereof in position to mesh with a second beveled gear, a shaft on said second beveled gear having an arm rigidly mounted thereon, the other end of said arm being loosely mounted on said bifurcated arm whereby when said rod is turned said bifurcated arm will cause said reflector to swing on its mountings, and means for controlling said shaft and arm.

8. An adjustable headlight including a casing, a reflector pivotally mounted in said casing, a tubular shaft extending upwardly through the support of said casing, means on said shaft for causing said reflector to be turned horizontally in said casing, a rod extending through said tubular shaft into said casing, means on said rod for causing said reflector to swing vertically therein, and external means for operating said shaft and rod whereby said reflector is controlled.

9. In combination with an automobile having a steering post thereon, of an adjustable headlight including a casing, a reflector pivotally mounted in said casing, a lamp secured in said reflector, shafts extending through the hood of the automobile one within the other adapted to engage and swing said reflector in different planes, and levers mounted on said steering post for independently controlling and operating said shafts.

In witness whereof, I have hereunto affixed my signature.

KARL R. VAUGHT.